United States Patent
Lee et al.

(10) Patent No.: US 10,788,086 B2
(45) Date of Patent: Sep. 29, 2020

(54) UNITIZED ONE-WAY WEDGE CLUTCH

(71) Applicant: SCHAEFFLER TECHNOLOGIES AG & CO. KG, Herzogenaurach (DE)

(72) Inventors: Brian Lee, York, SC (US); Bryan Barker, Liberty, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 185 days.

(21) Appl. No.: 15/978,379

(22) Filed: May 14, 2018

(65) Prior Publication Data

US 2019/0345993 A1    Nov. 14, 2019

(51) Int. Cl.
*F16D 15/00*      (2006.01)
*F16D 41/063*     (2006.01)
*F16D 125/58*     (2012.01)

(52) U.S. Cl.
CPC .......... *F16D 41/063* (2013.01); *F16D 15/00* (2013.01); *F16D 2125/582* (2013.01)

(58) Field of Classification Search
CPC ...... F16D 41/063; F16D 15/00; F16D 41/064; F16D 41/069
See application file for complete search history.

(56) References Cited

U.S. PATENT DOCUMENTS

| | | | | |
|---|---|---|---|---|
| 1,946,048 A * | 2/1934 | Verderber | ................. | F16B 1/04 |
| | | | | 192/223.2 |
| 2,150,715 A | 3/1939 | De Falco | | |
| 3,092,227 A * | 6/1963 | Dossier | ................. | F16D 41/063 |
| | | | | 192/41 R |
| 3,107,764 A * | 10/1963 | Fulton | .................. | F16D 41/063 |
| | | | | 192/41 R |
| 3,202,251 A * | 8/1965 | Fulton | .................. | F16D 41/063 |
| | | | | 192/45.1 |
| 3,236,345 A * | 2/1966 | Dietz | .................... | F16D 41/063 |
| | | | | 192/45.1 |
| 3,447,650 A * | 6/1969 | Dossier | ................. | F16D 41/063 |
| | | | | 192/41 R |
| 5,328,415 A | 7/1994 | Furutani et al. | | |
| 6,129,189 A * | 10/2000 | Kerr | ........................ | F02B 67/06 |
| | | | | 192/45.005 |
| 9,732,808 B2 | 8/2017 | Davis | | |
| 2008/0053784 A1 * | 3/2008 | Davis | .................... | F16D 41/063 |
| | | | | 192/41 A |
| 2016/0341262 A1 * | 11/2016 | Ramsey | ................ | F16D 41/063 |

FOREIGN PATENT DOCUMENTS

GB              496693 A  * 12/1938  ........... F16D 41/063

\* cited by examiner

*Primary Examiner* — Stacy A Fluhart
(74) *Attorney, Agent, or Firm* — Brooks Kushman P.C.

(57) ABSTRACT

A wedge clutch includes a drawn outer cup that axially contains the inner components of the clutch. In particular embodiments disclosed herein, a wedge clutch includes an inner race such as a hub, an outer race such as a carrier, and a plurality of wedge segments radially therebetween. The wedge segments are arranged and moveable about a central axis, and can move into and out of a wedging engagement between the inner race and outer race to transfer torque therebetween. A unitary, single drawn cup is flanged to axially contact and border the outer race and the wedge segments. This contains the outer race and the wedge segments axially, to improve operation of the clutch and create a unitized wedge clutch.

19 Claims, 2 Drawing Sheets

UNITIZED ONE-WAY WEDGE CLUTCH

TECHNICAL FIELD

The present disclosure relates to wedge clutches for coupling two or more components to enable torque to transfer therethrough. More particularly, the wedge clutch of this disclosure includes outer flanges that axially contain components of the wedge clutch.

BACKGROUND

A vehicle powertrain may include a wedge clutch for coupling an input shaft to an output shaft and to transfer torque therebetween. The wedge clutch may include an inner race connected to one of the shafts, and an outer race connected to the other of the shafts. A wedge element (e.g., wedge segments, wedge plate) may be radially disposed between the inner and outer races, and configured to wedge between and engage the inner and outer races to lock the clutch and transmit power from the input shaft to the output shaft.

U.S. Pat. No. 9,732,808 discloses one embodiment of a wedge clutch known in the art.

SUMMARY

According to one embodiment, a wedge clutch includes an inner race extending annularly about a central axis, and an outer race extending annularly about the central axis. A plurality of wedge segments are arranged annularly about the central axis and are disposed radially between the inner race and the outer race. At least a portion of each wedge segment increases in thickness in a circumferential direction to define a tapered profile. One of the inner race and outer race includes a plurality of tapered surfaces contacting the wedge segments such that circumferential movement of the wedge segments about the axis is configured to wedge between the inner race and outer race to transfer torque therebetween. An outer cup partially wraps around the outer race and axially containing the inner race, the outer race, and the plurality of wedge segments.

In another embodiment, a clutch includes a hub extending annularly about an axis having an outer surface defining a circumferential inner race. A carrier extends annularly about the axis and has an inner surface defining an outer race. The outer race has a plurality of tapered surfaces. A plurality of wedge segments are disposed radially between the inner race and outer race, and are oriented annularly about the axis. Each wedge segment has a tapered surface such that a thickness of each wedge segments increases along a circumferential direction. Circumferential movement of the wedge segments selectively wedges the wedge segments radially between the inner race and outer race to transfer torque therebetween. An outer cup has a pair of flanges axially spaced apart that axially contain the carrier and wedge segments therebetween.

In yet another embodiment, a method of manufacturing a clutch includes forming metal into a drawn cup having an annular end and a circumferential tube; assembling a plurality of wedge segments in an annular fashion within an annular carrier such that the wedge segments can slide within the carrier; assembling a hub radially inward of the wedge segments; assembling the carrier, the wedge segments, and the hub within the circumferential tube of the drawn cup; and flanging the circumferential tube over the carrier to form a flange extending radially inward such that the flange and the annular end axially contain the carrier and the wedge segments.

DETAILED DESCRIPTION

Figure 1:
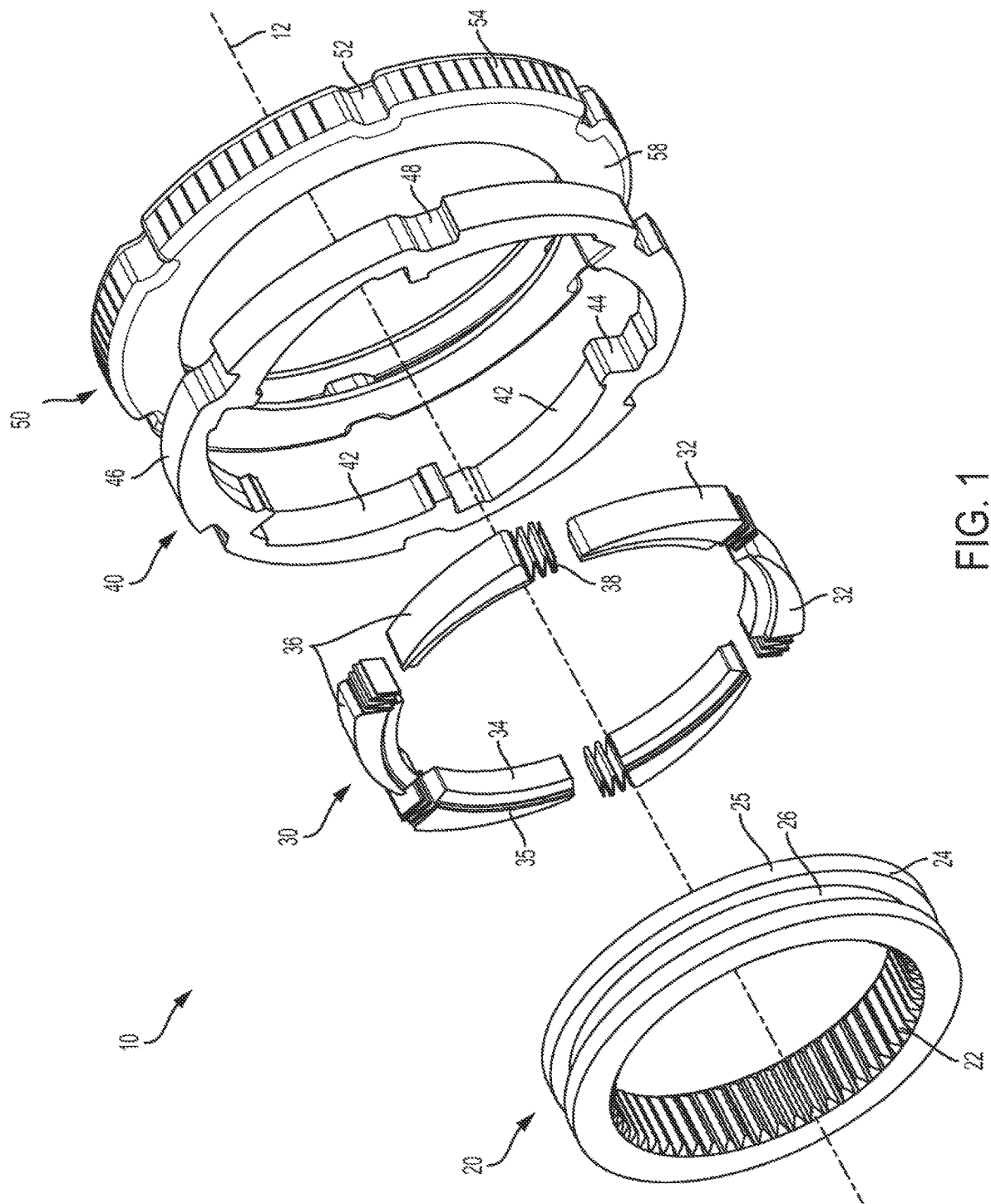
FIG. 1 is an exploded perspective view of a wedge clutch with an outer cup, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain directional terms may be used in this disclosure. It should be understood that those directional terms are for illustrative purposes in explaining the structure in the orientation shown in the Figures. For example, terms such as "upper," "lower," "inner," "outer," "top," "bottom," "upward," "downward," etc. are terms that refer to the orientation of the structure as shown in the Figures. For example, and in particular, terms like "inner" refer to a direction facing a central axis, whereas "outer" refers to a direction facing outwardly away from the central axis. Furthermore, terms such as "radial" and "circumferential" refer to directions relative to a central axis of rotation, and "axial" means along or parallel to the central axis relative to the orientation of the structure as shown in the Figures.

Wedge clutches typically include an inner race operatively connected to one shaft, an outer race operatively connected to another shaft or to a grounded housing, and wedge elements radially between the inner race and outer race. The wedge elements are tapered in a wedge shape and can move circumferentially to wedge between the inner race and outer race. This allows torque to transmit through the wedge clutch, from one shaft to another. Wedge clutches are typically assembled piece-by-piece in place relative to the shafts so as to prevent axial misalignment or slipping of various components during assembly.

According to embodiments disclosed herein, a wedge clutch is provided with an outer cup with flanges that contain various components of the wedge clutch. This allows the wedge clutch to be initially assembled together to form a unitary wedge clutch structure which can, in turn, be assembled as one piece to the connecting components (e.g., input shaft and output shaft). The outer cup can both axially and radially contain various pieces of the wedge clutch to form a unitized wedge clutch.

Referring to FIG. 1, a wedge clutch 10 is illustrated in an exploded, disassembled view. Various components of the wedge clutch 10 are shown, and include the following: an inner hub 20, a wedge ring 30, a carrier 40, and an outer cup 50. These components extend about a central axis 12, wherein each component may have an inner surface that faces radially toward the axis and an outer surface that faces radially away from the axis. As will be described below, the components may be configured to rotate about the axis 12.

Figure 2B:
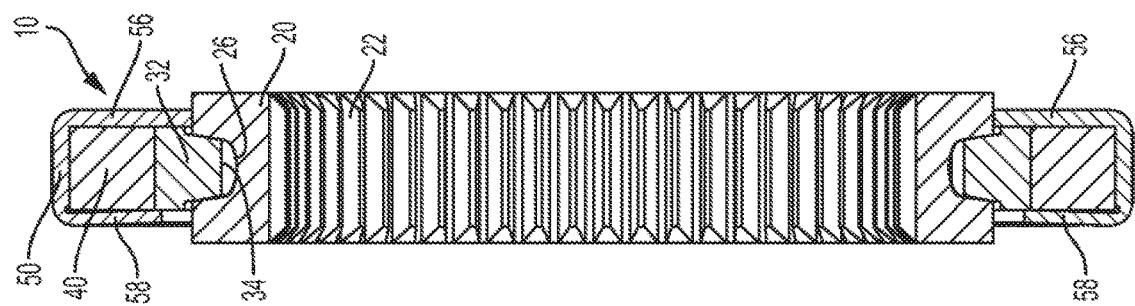
FIG. 2B is a side cross-sectional view of the assembled wedge clutch of FIG. 2A.
Figure 2A:
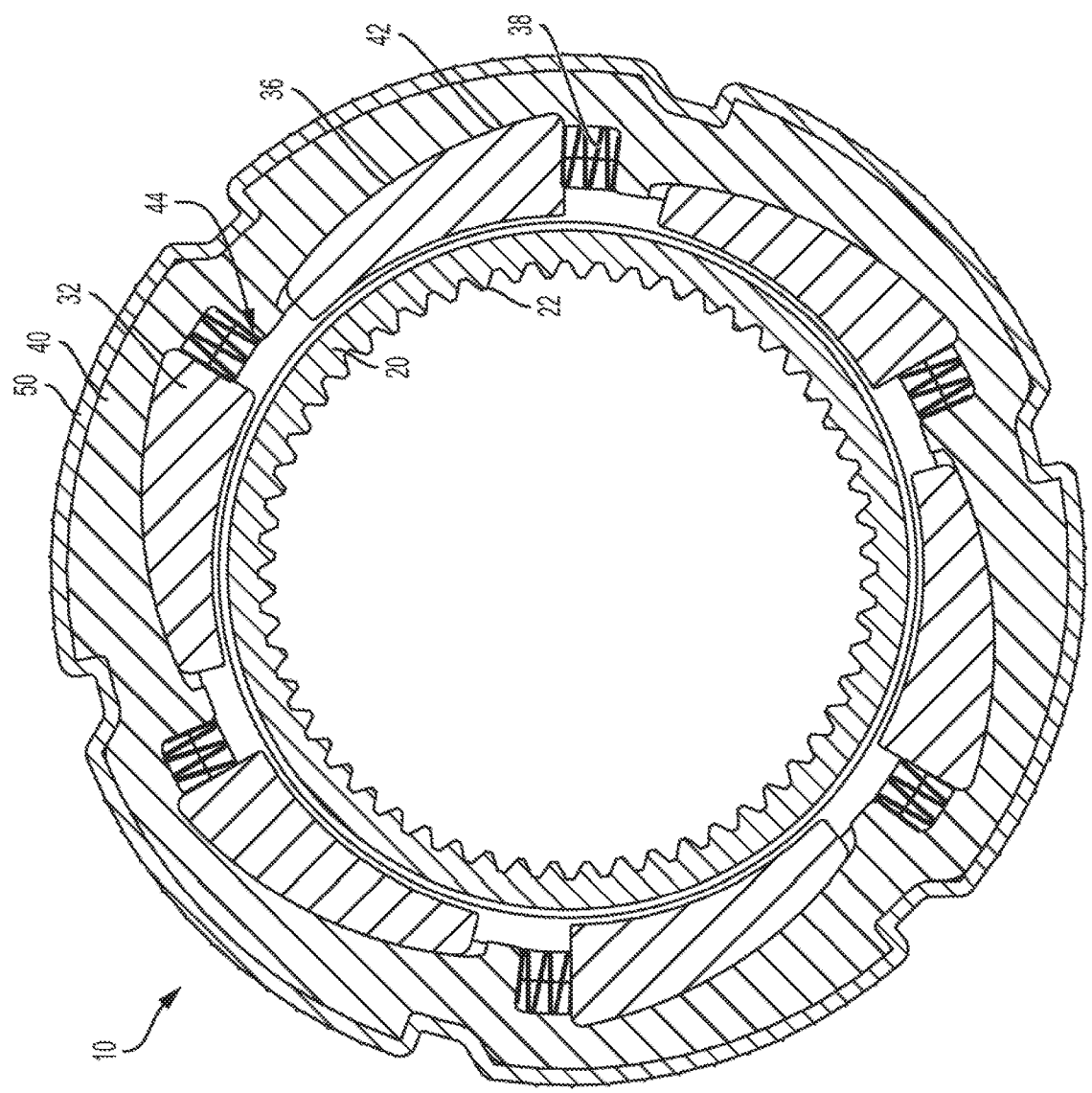
FIG. 2A is a front cross-sectional view of an assembled wedge clutch with an outer cup, according to one embodiment.

FIGS. 2A and 2B show a front cross-sectional view and a side cross-sectional view, respectively, of the wedge clutch 10 in an assembled state.

Referring to FIGS. 1, 2A and 2B, the inner hub 20 (also referred to as a hub) includes an inner surface 22 facing radially inwardly, and an outer surface 24 facing radially outwardly. The inner surface 22 may have spline features or teeth to engage with corresponding splines or teeth of a shaft (e.g., input shaft or output shaft). The outer surface 24 has a circumferential groove 26 which defines an inner race of the wedge clutch. The groove 26 may be centrally located between a pair of circumferential shoulders 28 so that the wedges of the wedge ring 30 are axially constrained to remain located in the groove 26.

The wedge ring 30 include a plurality of wedge segments 32 (also referred to as wedges). Although the wedge segments 32 are shown as separate elements not directly connected to one another, in another embodiment the wedge segments are part of a single annular wedge plate with gap or space at one location that allows the wedge plate to expand and contract.

The wedge segments 32 include a rounded inner surface 34. The rounded inner surfaces 34 can collectively be in a circular shape about the axis 12. The inner surfaces 34 can have a width sized to be received within the groove 26 of the inner hub 20. Also, each wedge segment 32 can have a shoulder 35 radially outward of the inner surface 34. The shoulder can be on either or both sides of the inner surface, and can engage with corresponding ledges 25 on either axial side of the groove 26 of the inner hub 20. In operation, the inner surfaces 34 of the wedge segments 32 slide along or within the groove 26, such that the wedge ring 30 can move circumferentially about the axis relative to the hub 20.

Each wedge segment 32 also has an outer surface 36. In one embodiment, the outer surfaces 36 are not collectively circular. Instead, the outer surfaces 36 may be tapered such that the wedge segments 32 are tapered to have a thickness that increases along a circumferential direction of that wedge segment. In other words, each wedge segment 32 may be wedge shaped, as shown in the cross-sectional view in FIG. 2A.

The carrier 40 has an inner surface with tapered regions or surface features 42 that are correspondingly tapered to match the tapered profile of the outer surface of the wedge segments 32. For example, the inner surface of the carrier 40 may have a plurality of tapered regions 42 that also are collectively not circular. This can create a thickness of the carrier 40 that changes in the circumferential direction about the axis 12.

The tapered profile of the tapered regions 42 matches the tapered profile of the wedge segments 32. This allows the wedge segments 32 to "wedge" radially between the inner hub 20 and the carrier 40. In one embodiment, when the wedge segments 32 are forced in a first circumferential direction (e.g., counter-clockwise in the view of FIG. 1), the tapered outer surface 36 of the wedge segments 32 slides along the tapered regions 42 of the carrier 40, while the inner surface 34 of the wedge segments 32 slide along the circumferential outer surface 24 of the hub 20 until the wedge segments 32 can no longer move circumferentially. This locks the inner hub 20 to the carrier 40 in one rotational direction so that torque can transfer between the hub 20 and the carrier. This can be referred to as a "locked" mode or a "one-way locked" mode of operation.

The wedge clutch 10 can include a plurality of springs 38. Each spring 38 can be circumferentially disposed between a respective one of the wedge segments 32 and the carrier 40. In one embodiment, the carrier 40 includes protrusions 44 extending radially inwardly that provide as a point of attachment or coupling for the springs 38. The springs 38 can be biased to force the wedge segments 32 in the first circumferential direction (e.g., counter-clockwise in the views of FIGS. 1-2) to bias the wedge clutch 10 in the locked mode.

If the wedge segments 32 are moved in a second circumferential direction (e.g., clockwise in the view of FIG. 1), the wedge segments 32 can unwedge from between the hub 20 and the carrier 40. In particular, the wedge segments 32 can slide in the second circumferential direction relative to both the hub 20 and the carrier 40. This allows the inner hub 20 and the carrier 40 to freewheel relative to one another in the second circumferential direction. This can be referred to as a "freewheel" mode or an "unlocked" mode of operation for the wedge clutch.

As shown in the illustrated embodiment, the carrier 40 may have an outer surface 46 with a plurality of indentations 48 formed therein at spaced locations about the axis 12. The outer cup 50 may also have corresponding indentation features 52 that extend radially inward and mate with the indentations 48. This mating of indentation features may be used if the torque requirements are higher than the slip torque capable of a press fit between the carrier 40 and the cup 50. The mating of indentations can key the cup 50 to the carrier 40. Also, the outer surface of the indentations 52 formed in the cup 50 provide as attachment features for an external component to mate onto the cup 50.

The wedge clutch 10 can change from the locked to the unlocked mode by several actuation methods. In one embodiment, movement of the carrier 40 (via, for example, the outer cup 50) in the second circumferential direction may cause the wedge segments 32 to move in the second circumferential direction along the inner hub 20 but slide relative to the carrier 40 in the first circumferential direction until the wedge segments 32 are in a wedged engagement, thus transferring torque from the carrier 40 to the inner hub 20. In another embodiment, the wedge segments 32 are connected to an actuator that is hydraulically actuated to move the wedge segments 32 in a circumferential direction to either lock or unlock the wedge clutch 10. In another embodiment, the wedge segments 32 are connected to an actuator that is electromagnetically actuated to move the wedge segments 32 in a circumferential direction to either lock or unlock the wedge clutch 10.

As briefly explained above, the outer cup 50 is provided with flanges that axially contain the inner components of the wedge clutch. For example, in the illustrated embodiment, the outer cup 50 has an outer surface 54 that extends in the axial direction and circumferentially about the axis 12, and a pair of flanges on either axial end of the outer surface 54. For example, a first flange 56 extends radially inwardly on one axial side of the cup 50, and a second flange 58 extends radially inwardly on another axial side of the cup 50. The flanges 56, 58 are bent inwardly to form annularly-shaped retaining features that can engage the axial sides of both the carrier 40 and the wedge segments 32. The outer surface 54, and first flange 56, and the second flange 58 collectively define an outer cup 50 that has a U-shaped cross-sectional profile, as shown in FIG. 2B. With the flanges 56, 58, the outer cup 50 can encapsulate the carrier 40 and the wedge ring 30 between the inner hub 20 and the outer cup 50. This prevents unwanted debris from interfering with the operation of the wedge segments 32, and also prevents unwanted axial movement of either the carrier 40 or the wedge segments 32 to improve operation.

In one embodiment of manufacturing, the cup 50 can initially be provided as a metal blank or sheet. The sheet can be cut or punched to take a ring shape with a circumferential outer surface and a circumferential inner surface. The sheet can be initially drawn to have one flange (e.g., the first flange 56) bent radially inwardly. This flange can have a well-controllable inner diameter and can be used to rotationally pilot the inner hub during assembly. The inner components of the clutch (e.g., the carrier 40, the wedge ring 30, and the hub 20) can be assembled to one another, and then placed against the first flange 56. The second flange 58 can then be formed by bending the metal over and around the carrier 40 to wrap around the carrier 40. This retains and encapsulates the carrier 40 and wedge ring 30. Thus, a unitized wedge clutch is provided.

The flanges 56, 58 on either side of the cup 50 allow the wedge clutch to be initially assembled together to form a unitary wedge clutch structure which can, in turn, be assembled as one piece to the connecting components (e.g., input shaft and output shaft). The outer cup can both axially and radially contains various pieces of the wedge clutch to form a unitized wedge clutch.

The illustrated embodiment is but one embodiment of a wedge clutch provided with a drawn cup to encapsulate various components. In another embodiment, the wedge clutch is reversed in that the inner surfaces of the wedge segments are tapered and mate with corresponding tapered surface features of the hub, while the outer surfaces of the wedge segments can collectively be circumferential about the axis to mate with a corresponding circumferential surface or groove in the carrier. In that embodiment, the hub may be radially outward of the carrier. Therefore, it may be said that in either embodiment, there is an inner race, an outer race, and wedge segments or a wedge ring radially between the inner and outer race, with the outer cup at least partially encapsulating the outer race and the wedge segments or wedge plate. Furthermore, in various embodiments, the outer cup may be a single layer or sheet of material that is bent to directly contact and surround at least three sides (outer, first axial, and second axial) of one or both of the wedge ring and the outer race.

In the illustrated embodiment, the wedge segments 32 are separate from one another and not directly connected by a single component. While not shown, the wedge segments 32 can also be bound together by an annular ring spring connected to all six wedge segments. The ring spring can extend annularly about the axis 12, can contact each of the wedge segments to interconnect them, and can be biased to constrict or expand the wedge segments about the axis.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 wedge clutch
12 central axis
20 inner hub
22 inner surface
24 outer surface
25 ledge
26 groove
30 wedge ring
32 wedge segment
34 inner surface
35 shoulder
36 outer surface
38 spring
40 carrier
42 tapered regions
44 projections
46 outer surface
50 outer cup
52 indentation
54 outer surface
56 first flange
58 second flange

What is claimed is:
1. A wedge clutch comprising:
an inner race extending annularly about a central axis;
an outer race extending annularly about the central axis;
a plurality of wedge segments arranged annularly about the central axis and disposed radially between the inner race and the outer race, wherein at least a portion of each wedge segment increases in thickness in a circumferential direction to define a tapered profile, and wherein one of the inner race and outer race includes a plurality of tapered surfaces contacting the wedge segments such that circumferential movement of the wedge segments about the axis is configured to wedge between the inner race and outer race to transfer torque therebetween; and a single-piece drawn outer cup partially wrapping around the outer race and axially containing the inner race, the outer race, and the plurality of wedge segments.

2. The wedge clutch of claim 1, wherein the outer cup includes an axially-extending portion and a pair of outer flanges extending radially inwardly from the axially-extending portion.

3. The wedge clutch of claim 2, wherein the outer flanges each contact a corresponding axial face of the outer race.

4. The wedge clutch of claim 2, wherein the outer flanges each contact corresponding axial faces of the wedge segments.

5. The wedge clutch of claim 2, wherein the outer flanges each include an inner end facing radially inward and contacting an outer surface of the inner race.

6. The wedge clutch of claim 2, wherein the axially-extending portion has a cylindrical outer surface.

7. The wedge clutch of claim 1, wherein the outer cup is U-shaped with an annular open end facing radially inward, and wherein the outer cup is wider in an axial direction than the outer race and the wedge segments.

8. The wedge clutch of claim 1, wherein the inner race is wider in an axial direction than the outer cup, and the outer cup is wider in the axial direction than the outer race and the wedge segments.

9. The wedge clutch of claim 1, wherein the wedge segments are separate components and not directly connected to one another.

10. The wedge clutch of claim 1, wherein the outer race includes an outer surface defining a first plurality of indentations, and the outer cup includes a second plurality of indentations aligned and mating with the first plurality of indentations.

11. The wedge clutch of claim 1, wherein the outer race includes an inner surface defining a plurality of inwardly-extending projections, and the wedge clutch further includes a plurality of springs, each spring disposed between and connecting one of the wedge segments and one of the projections.

12. A clutch comprising:
a hub extending annularly about an axis having an outer surface defining a circumferential inner race;
a carrier extending annularly about the axis and having an inner surface defining an outer race, wherein the outer race has a plurality of tapered surfaces;
a plurality of wedge segments disposed radially between the inner race and outer race and oriented annularly about the axis, each wedge segment having a tapered surface such that a thickness of each wedge segments increases along a circumferential direction, wherein circumferential movement of the wedge segments selectively wedges the wedge segments radially between the inner race and outer race to transfer torque therebetween; and
an outer cup having a pair of flanges axially spaced apart that axially contain the carrier and wedge segments therebetween, wherein one of the flanges extends further radially inward than the other of the flanges.

13. The clutch of claim 12, wherein at least one of the pair of flanges has an end that contacts the hub.

14. The clutch of claim 12, wherein the outer cup contacts an axial face of the carrier and axial faces of the wedge segments.

15. The clutch of claim 12, wherein no part of the carrier or the wedge segments extends axially beyond the outer cup.

16. The clutch of claim 12, wherein the outer cup includes an axially-extending portion connecting the flanges and defining a radially outermost portion of the cup.

17. The clutch of claim 12, wherein the inner race is a circumferential grooveeft defined on the outer surface of the hub, and wherein the pair of flanges define a space therebetween that is axially wider than the inner race.

18. A method of manufacturing a clutch, comprising:
forming metal into a drawn cup having an annular end and a circumferential tube;
assembling a plurality of wedge segments in an annular fashion within an annular carrier such that the wedge segments can slide within the carrier;
assembling a hub radially inward of the wedge segments;
assembling the carrier, the wedge segments, and the hub within the circumferential tube of the drawn cup; and
bending the circumferential tube over the carrier to form a flange extending radially inward such that the flange and the annular end axially contain the carrier and the wedge segments.

19. The method of claim 18, further comprising forming the carrier to include a plurality or ramped inner surfaces, and forming the wedge segments to include a plurality of ramped outer surfaces, wherein the step of assembly the plurality of wedge segments includes contacting the ramped outer surfaces of the wedge segments with the ramped inner surfaces of the carrier.

\* \* \* \* \*